United States Patent
Likar et al.

(10) Patent No.: US 8,885,511 B2
(45) Date of Patent: Nov. 11, 2014

(54) METHOD FOR SELF ORGANIZING NETWORK OPERATION

(71) Applicant: Accelera, Inc., Santa Clara, CA (US)

(72) Inventors: Bojan Likar, Cupertino, CA (US); Robert Posel, Ljubljana (SI); Andreas Kalagasidis, Ljubljana (SI); Tomaz Javornik, Grosuplje (SI); Gorazd Kandus, Ljubljana (SI); Janez Sterle, Ljubljana (SI); Urban Sedlar, Bohinjska Bistrica (SI); Janez Bester, Zg.Besnica (SI); Andrej Kos, Blejska Doborava (SI); Luka Mali, Novo Mesto (SI)

(73) Assignee: Accelera, Inc., Santa Clara, CA (US)

( * ) Notice: Subject to any disclaimer, the term of this patent is extended or adjusted under 35 U.S.C. 154(b) by 0 days.

(21) Appl. No.: 13/901,417

(22) Filed: May 23, 2013

(65) Prior Publication Data
US 2013/0343212 A1    Dec. 26, 2013

Related U.S. Application Data

(63) Continuation of application No. 12/827,965, filed on Jun. 30, 2010, now Pat. No. 8,472,334.

(51) Int. Cl.
*H04L 12/26* (2006.01)
*H04Q 7/00* (2006.01)
*H04W 24/10* (2009.01)
*H04L 12/24* (2006.01)
*G05B 19/418* (2006.01)
*H04W 24/02* (2009.01)

(52) U.S. Cl.
CPC .......... *H04W 24/10* (2013.01); *H04L 41/0836* (2013.01); *G05B 19/4185* (2013.01); *H04W 24/02* (2013.01)
USPC .......................................... 370/252; 370/328

(58) Field of Classification Search
None
See application file for complete search history.

(56) References Cited

U.S. PATENT DOCUMENTS

| | | | |
|---|---|---|---|
| 7,627,347 B2 * | 12/2009 | Codreanu et al. | 455/562.1 |
| 2007/0076650 A1 * | 4/2007 | Manjeshwar et al. | 370/328 |
| 2008/0070580 A1 * | 3/2008 | Menich et al. | 455/446 |
| 2010/0167730 A1 * | 7/2010 | Shin | 455/434 |
| 2010/0216486 A1 * | 8/2010 | Kwon et al. | 455/452.2 |
| 2011/0014925 A1 * | 1/2011 | Antic et al. | 455/452.2 |

* cited by examiner

*Primary Examiner* — Hong Cho
(74) *Attorney, Agent, or Firm* — Van Pelt, Yi & James LLP

(57) ABSTRACT

The present invention relates to wireless cellular telecommunication networks and, in particular, to control and management of self organizing wireless cellular telecommunication network. A method for network planning and frequency optimization in LTE networks by determining the optimal base station configuration parameters, comprises a base station initialization, an initial base station configuration, an iterative measurement procedure, an optimization process, a verification of operation, and a periodical maintenance procedure.

10 Claims, 3 Drawing Sheets

METHOD FOR SELF ORGANIZING NETWORK OPERATION

CROSS REFERENCE TO OTHER APPLICATIONS

This application is a continuation of co-pending U.S. patent application Ser. No. 12/827,965, entitled METHOD FOR SELF ORGANIZING NETWORK OPERATION filed Jun. 30, 2010 which is incorporated herein by reference for all purposes.

FIELD OF THE INVENTION

The present invention relates to wireless cellular telecommunication networks and, in particular, to control and management of self organizing wireless cellular telecommunication network.

BACKGROUND OF THE INVENTION

Wireless cellular telecommunication networks comprise a core data network and a wireless network. The wireless access part of the network must be carefully planned in order for each user to receive the radio signal of sufficient quality. The strength and quality of the signal in the core part of the network enable adequate capacity of services in the wireless telecommunication network.

The proper coverage of a geographical area with a radio signal is provided by means of macro base stations grouped in a cluster of cells. In order to increase the wireless network capacity, distributed small base station entities have been considered which have been defined as nano, pico and femto base stations with a smaller radio coverage in comparison to macro base stations.

Operating parameters, such as operating frequency, antenna orientation, transmission intensity and so forth, are essential for optimal wireless access telecommunication network operation. Within a discrete geographic region the base stations are assigned a limited number of carrier frequencies. Suitable choice of many other operating parameters is also important. The of a base station or of an individual mobile terminal often has a profound effect on both the interference generated for other base stations or for users who are not the intended receiver of the transmission. This reduces the probability of successful transmission reception by the intended receiver. A variety of other operating parameters, in addition to the operating frequency, such as antenna orientation, hand-off thresholds, traffic power limits, and pilot power fraction of total amplifier power similarly affect network function.

In establishing an operating communications network, identification parameters are set for each base station, often enumerating as many as few hundred base stations for a metropolitan area. Thus, significant planning based on above mentioned parameters typically precedes such establishment. Although at least some of these parameters are adjusted as the network evolves, the incipient choices are carefully made to avoid initial network failure or to avoid an excessive duration and area of unacceptable operation. Even after the network becomes operational, further base stations are added as the network expands. Such additional base stations have identification and operating parameters that require initialization. A poor initial choice of parameters has the potential for causing a network failure or unacceptable degradation of reception for existing users.

Currently, radio networks are being planned using specialized planning software which initially estimates the radio signal from different base station sites. The planning software is then used to calculate interference between base stations which affects the performance of the radio network. In addition to planning software, different kinds of measurement equipment is used in radio network planning, such as field measuring devices, a radio network control system, and specialized software for comparing the estimated and measured data, presenting the information in visual form or in other ways. Traditional network planning comprises radio frequency measurements to determine environmental factors and extensive simulations based on the measured data to determine the optimal placement and parameters of base stations.

One purposed approach for reducing complexity of the network management, thus reducing the expenditures, is auto configuration, in auto configuration procedures a base station automatically establishes some or ail of its own identification and operations parameters upon initialization.

SUMMARY OF THE INVENTION

The invention describes a method for auto configuration of mobile telecommunication networks. The auto configuration procedure is based on the location data, provided by the base station using a variety of inputs. Following the initialization procedure, the self organizing network (SON) server calculates a set of safe operating parameters which are sequentially fed to the newly initialized base station. Newly initialized base station is set into signal generation mode, and neighbouring base stations are sent a command to begin a measurement mode. The measurement is conducted by the neighbouring base station by communicating with the stationary mobile stations. Relevant characteristic data of the mobile radio network at the position of the mobile radio station are acquired by the mobile radio terminal device under normal conditions of use and the measured data is sent to the neighbouring base station. Neighbouring base station relays the data to the SON server for further analysis. The procedure is repeated for all calculated candidate configurations.

The subsequent further processing of the thus forwarded data can advantageously be used for planning and optimization of the radio network infrastructure (neighbourhood planning, setting of operating parameters, etc.).

Main motivation for described procedures is the reduction of the complexity of network management processes and consequential reduction of operational expenses.

BRIEF DESCRIPTION OF THE FIGURES

A method for auto configuration of mobile telecommunication networks according to the present invention will be described in details hereinafter with references to the accompanying figures, wherein.

DESCRIPTION OF PREFERRED EMBODIMENTS

Figure 1:
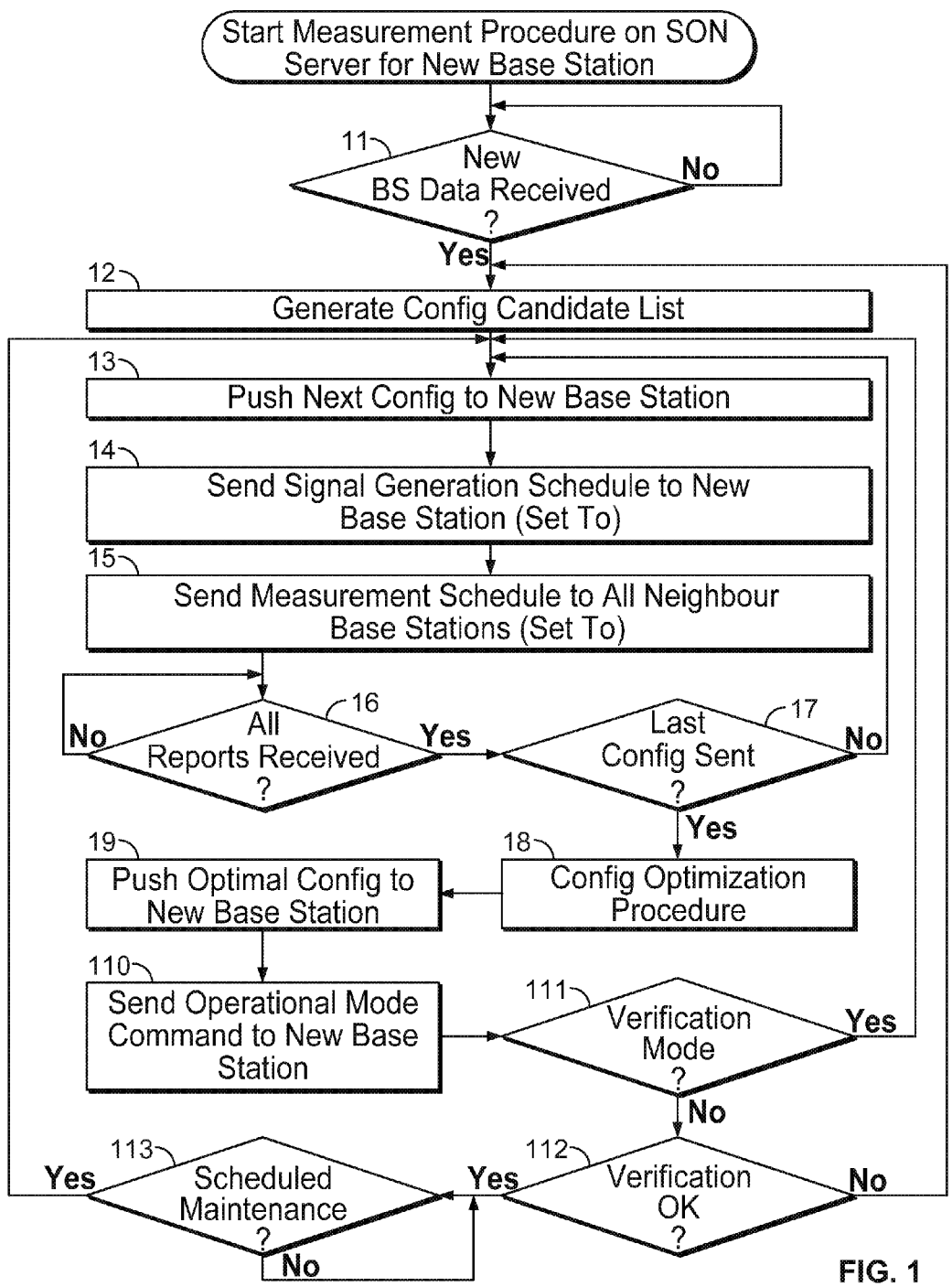
FIG. 1 shows schematically steps of a method according to the invention carried out on the SON server.

A sequential diagram of an algorithm carried out on said SON server can be depicted from FIG. 1. Lists of neighbouring base stations, mobile terminals and configuration files for a new base station are prepared on said SON server. The latter determines a start of the precise synchronised measurement, and receives measured data upon finished measurements and calculates optimal operational radio parameters in order to start a new base station. In addition, said SON server takes care of the verification steps.

A method is carried out on said SON server taking care of the execution of the measuring procedure in said self organizing network. At the beginning, said SON server waits for an initialization request from a new base station (step 11). When such a request is received by said SON server, it prepares for said new base station a list of configuration files comprising operational parameters (step 12). When said list is ready, said SON server transmits the first configuration file to a new base station (step 13). In the next step, said SON server sends a command to execute measurements to a new base station (step 14) and to neighbouring base stations (step 15) which are determined by means of the location and the orientation of an antenna of the new base station and selected frequency being determined in the first configuration file. Said SON server is put into a state where it waits for expected measuring results from the neighbouring base stations (step 16). A measuring process is repeated for all further configuration files (step 17). When all the intended measurements are finished, said SON server carries out an optimization process of operational parameters (step 18). The calculated optimal configuration file is transmitted to a new base station (step 19). Said new base station is marked as an operational one (step 110), thus the latter become equivalent to the others in the network and is ready to receive mobile terminals. During the starting hours and days the measurement with optimal parameters are repeated several times (step 111) which is necessary in order to confirm the adequacy of the assigned radio parameters. If the verification fails (step 112), the process is repeated for all files, wherein again there are searched optimal operational radio parameters of the system. Said SON server also comprises a schedule of a so called system maintenance, when several times a year the adequacy of the base station (step 113) radio parameters are verified again.

Figure 2:
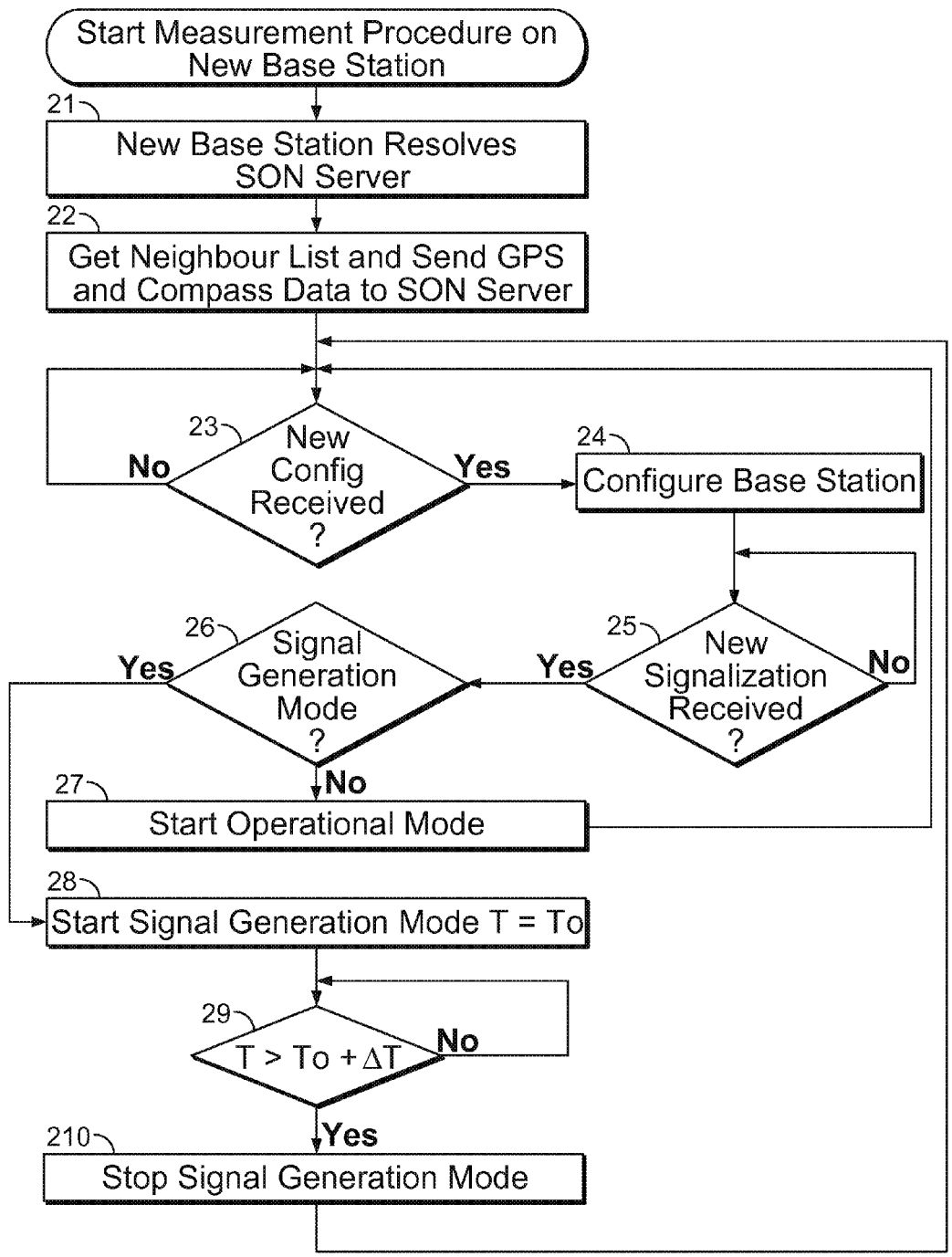
FIG. 2 shows schematically steps of a method according to the invention carried out on a new base station.

A sequential diagram of an algorithm carried out on a new base station may be depicted from the FIG. 2. Based on the time synchronisation with said SON server said new base station starts to broadcast a synthesized radio signal of a full power with radio parameters determined by said SON server. Said base station operates as the operational base station, yet it does not accept any mobile terminals.

Upon start-up, said base station acquire by means of a DHCP protocol (step 21) an address of said SON server and transmits to the latter the data of its own location and antenna orientation acquired by means of a GPS receiver and electronic compass (step 22). Said new base station is put in a state for obtaining the configuration file (step 23). When said configuration file is received, the radio parameters (step 24) are set accordingly. When said new base station receives a signal impulse (step 25) which represents a time synchronised request for a measurement (step 26), it starts at the time To with the broadcasting of a synthesized radio signal (step 27). After the planned time frame for carrying out an individual measurement (step 28) has expired, said new base station stops transmitting the synthesized radio signal (step 29). Upon the finished measurements, said new base station receives from said SON server an optimal configuration file representing radio parameters for operating of said base station which may now receive mobile terminals (step 210).

Figure 3:
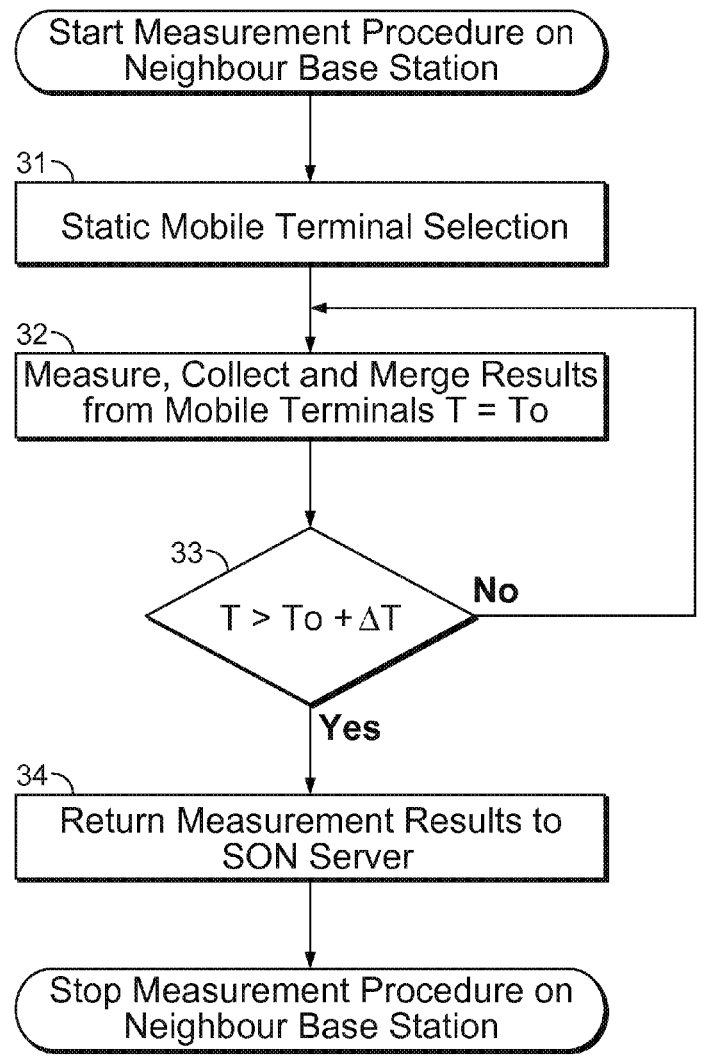
FIG. 3 shows schematically steps of a method according to the invention carried out on neighboring base stations.

FIG. 3 represents a sequential diagram of an algorithm carried out on neighbouring base stations. Said neighbouring base stations are determined within said SON server on the basis of the information regarding the position and the orientation of the antenna of a new base station, separately for each frequency measured. Neighbouring base stations carry out radio measurements by means of stationary mobile terminals which are, within the time frame provided for carrying out said measurements, connected with the base stations. The measuring process on the mobile terminals is standardized.

When the neighbouring base station receives a request for measurement from said SON server, it prepares a list of stationary mobile terminals (step 31). Said stationary mobile terminals are terminals where measurements of radio conditions do not change over time. At the time To (step 32) the neighbouring base stations start sending cyclic standardized requests for measurement to all attached stationary mobile terminals. Said mobile terminals answer the requests with measuring the results, and the base station accepts said results and provides them with time stamp. The measurement is finished at the time T>To+$\Delta$T (step 33), when said neighbouring base station sends measuring results to said SON server (step 34).

What is claimed is:

1. A method of determining a set of preferred base station configuration parameters for a base station by a self-organizing network (SON) server, comprising:
   receiving an indication from the base station;
   generating a plurality of sets of base station configuration parameters;
   sending the plurality of sets of base station configuration parameters to the base station;
   testing each of the plurality of sets of base station configuration parameters, comprising:
      signaling the base station to broadcast a radio signal, wherein the base station is configured with the set of base station configuration parameters being tested;
      signaling one or more neighboring base stations to collect a set of measurements in response to the broadcasted radio signal; and
      receiving the set of measurements from the one or more neighboring base stations;
   determining a preferred set of base station configuration parameters based on the sets of measurements; and
   transmitting the preferred set of base station configuration parameters to the base station.

2. The method of claim 1, wherein the indication comprises an initialization request received from the base station, and wherein the base station comprises a new base station.

3. The method of claim 1, wherein a set of base station configuration parameters comprises one or more of the following: operating frequency, antenna orientation, transmit power, hand-off thresholds, traffic power limits, and pilot power fraction of total amplifier power.

4. The method of claim 1, further comprising:
   determining the one or more neighboring base stations based at least in part on a location of an antenna of the base station.

5. The method of claim 1, further comprising:
   determining the one or more neighboring base stations based at least in part on an orientation of an antenna of the base station.

6. The method of claim 1, further comprising:
   determining the one or more neighboring base stations based at least in part on an operating frequency of the base station.

7. The method of claim 1, further comprising verifying the base station configuration parameters, comprising:
   re-testing each of the plurality of sets of base station configuration parameters, comprising:

signaling the base station to broadcast a radio signal, wherein the base station is configured with the set of base station configuration parameters being tested;

signaling one or more neighboring base stations to collect a set of measurements in response to the broadcasted radio signal; and receiving the set of measurements from the one or more neighboring base stations;

determining a new preferred set of base station configuration parameters based on the sets of measurements.

8. The method of claim 1, further comprising:

receiving from the base station a location and an antenna orientation of the base station.

9. The method of claim 1, wherein a set of measurements collected by the one or more neighboring base stations comprises measurements measured by stationary mobile terminals attached to the one or more neighboring base stations.

10. The method of claim 1, further comprising:

associating a timestamp with a received set of measurements from the one or more neighboring base stations.

* * * * *